July 2, 1968 A. SCHNEIDER 3,390,657
GANTRY CRANE FOR LOADING BARGES ON SHIPS
Filed Aug. 12, 1966 11 Sheets-Sheet 1

Fig. 1

INVENTOR.
ALFRED SCHNEIDER
BY BOSWORTH, SESSIONS
HERRSTROM & KNOWLES
ATTORNEYS

July 2, 1968  A. SCHNEIDER  3,390,657
GANTRY CRANE FOR LOADING BARGES ON SHIPS
Filed Aug. 12, 1966  11 Sheets-Sheet 2

Fig. 2

INVENTOR.
ALFRED SCHNEIDER
BY BOSWORTH, SESSIONS
HERBSTROM & KNOWLES
ATTORNEYS

INVENTOR.
ALFRED SCHNEIDER
BY BOSWORTH, SESSIONS,
HERRSTROM & KNOWLES

ATTORNEYS

Fig. 6

July 2, 1968  A. SCHNEIDER  3,390,657
GANTRY CRANE FOR LOADING BARGES ON SHIPS
Filed Aug. 12, 1966  11 Sheets-Sheet 6

INVENTOR.
ALFRED SCHNEIDER
BY BOSWORTH, SESSIONS,
HERRSTROM & KNOWLES
ATTORNEYS

July 2, 1968     A. SCHNEIDER     3,390,657
GANTRY CRANE FOR LOADING BARGES ON SHIPS
Filed Aug. 12, 1966     11 Sheets-Sheet 7

INVENTOR.
ALFRED SCHNEIDER
BY BOSWORTH, SESSIONS,
HERRSTROM & KNOWLES
ATTORNEYS

July 2, 1968   A. SCHNEIDER   3,390,657
GANTRY CRANE FOR LOADING BARGES ON SHIPS
Filed Aug. 12, 1966   11 Sheets-Sheet 8

INVENTOR.
ALFRED SCHNEIDER
BY BOSWORTH, SESSIONS,
HERRSTROM & KNOWLES
ATTORNEYS

July 2, 1968 — A. SCHNEIDER — 3,390,657
GANTRY CRANE FOR LOADING BARGES ON SHIPS
Filed Aug. 12, 1966 — 11 Sheets-Sheet 9

INVENTOR.
ALFRED SCHNEIDER
BY BOSWORTH, SESSIONS,
HERRSTROM & KNOWLES
ATTORNEYS

July 2, 1968 A. SCHNEIDER 3,390,657
GANTRY CRANE FOR LOADING BARGES ON SHIPS
Filed Aug. 12, 1966 11 Sheets-Sheet 10

INVENTOR.
ALFRED SCHNEIDER
BY BOSWORTH, SESSIONS,
HERRSTROM & KNOWLES
ATTORNEYS

United States Patent Office 3,390,657
Patented July 2, 1968

3,390,657
GANTRY CRANE FOR LOADING BARGES ON SHIPS
Alfred Schneider, Bremen, Germany, assignor to The Morgan Engineering Company, Alliance, Ohio
Filed Aug. 12, 1966, Ser. No. 572,052
8 Claims. (Cl. 114—43.5)

ABSTRACT OF THE DISCLOSURE

A traveling shipboard gantry crane for loading barges on ships. The crane travels on spaced parallel rails on opposite sides of a ship's deck and includes a hoist mechanism for connection to a barge and for lifting and transporting the barge between an outboard floating position and a storage position in a cargo hold of the ship. Means are provided for maintaining tension in the hoist ropes during relative motion between the ship and the barge while the hoist means is engaging the barge and the barge is being tossed by sea swell and the gantry drive units are suspended from the gantry legs by a parallel link type parallelogram support to isolate the drive units from lateral loads experienced by the gantry crane.

---

The present invention relates to a sea-going transport system wherein cargo is loaded on barges which are floated to a ship, lifted from the water and deposited in the ship's cargo hold by a crane carried on the ship, and subsequently unloaded in the reverse manner when the ship reaches its destination. More particularly my invention relates to a gantry crane adapted for use on ships which are designed for use in connection with a barge transportation system, the crane being operable to lift barges and transport them on the ship between a cargo hold and an outboard floating position.

The sea-going transport system of the type referred to affords many unique advantages not derived from more conventional systems where cargo is deposited in the hold of the ship while the ship is tied up at a dock. The conventional systems require deep-sea port facilities and suitable docking space which must be occupied by the ship for a considerable period of time during loading and unloading. This severely limits the operative efficiency of the ship since a large portion of its serviceable time is wasted at the loading docks.

In the present system, the ship need not tie up at a dock during loading and unloading of cargo. It need merely weigh anchor, preferably in a sheltered harbor, and begin loading floating barges from the water or vice versa. Deep-draft port facilities are therefore not required.

Ships for which the gantry crane of my invention is designed, generally load the barges from the stern and the crane carries them longitudinally of the ship to a cargo hatch through which they are lowered into the ship's hold. The barges used in connection with this system may have a cargo carrying capacity of around 350 tons and a combined maximum weight including cargo and barge of around 500 tons. In a typical situation barges of this size and weight may be loaded during a loading cycle having an average duration of around 15 minutes. This would enable the ship to load around 1400 tons of cargo per hour.

The crane for lifting the barges and transporting them on the ship must be so designed and so mounted for travel that it can clamp onto and lift a floating barge from an outboard position in the water, vertically upward to a height which will enable it to pass over the stern of the ship, traverse the ship while carrying the barge to a desired loading hatch and lower the barge through the hatch into the cargo hold. This scope of operation presents problems which the capabilities of conventional gantry cranes do not satisfy.

In particular, a ship which is designed to carry barges according to the system, does not provide a stable platform comparable to that available where cranes are mounted on shore or on loading docks. For example the ship may be unloading or loading during varying conditions of keel trim and port or starboard list.

Also, since the barges are normally loaded and unloaded at sea, some vertical motion of the barges relative to ship may be expected during the clamping and lifting operation due to sea swell. The swell causes the barges to toss about and rock in any number of ways. This movement makes clamping difficult and also could cause the hoist ropes to go slack during lifting and then snap taut as the swell recedes, putting an undesirable shock load on the lifting mechanism. More importantly, the slack hoist ropes could become entangled with the pulleys and crane structure and cause serious damage to the hoist mechanism.

The present invention provides a gantry crane adapted for use in connection with a sea-going vessel designed to carry barges according to the system referred to above, and which satisfies the unique capability requirements of this type of operation and also affords other unexpected advantages not obtainable from the prior art.

According to my invention there is provided a gantry crane comprising a frame having a transverse dimension adapted to span a cargo hatch laterally of the ship and having ends extending parallel to the longitudinal direction of travel of the crane on the ship. The frame is supported on legs, at least two of which are rigidly connected to one end of the frame and at least two of which may be pivotally connected at the other in order to compensate for variations in spacing between the rails or ways on opposite sides of the ship on which the crane travels. The legs are supported on mobile carriages having wheels adapted for travel on spaced rails or ways extending longitudinally of the ship on opposite sides of the cargo hatches. Means is provided for guiding and propelling the carriages along the rails through desired limits of travel to permit transportation of the barges between an outboard floating position and a storage position in the cargo holds. Mounted on the frame are hoists having ropes which support a traverse frame formed of flexibly connected members and adapted for connection to a barge, the hoists being effective to lift the traverse frame and attached barge. Means is also provided for maintaining the tension in the hoist ropes while the traverse frame is connected to the barge, during vertical movements of the barge relative to the ship caused by swell.

In the preferred embodiment of my invention the swell compensating means comprises levers having one end pivotally connected to the frame and the other end adapted to carry a pulley from which the hoist ropes are suspended. The levers are pivotable between a raised position and a lowered position and are biased upwardly with sufficient force that the traverse frame itself is supported by the levers while they are in the raised position. When a barge is being lifted from the water, the combined weight of the traverse frame and barge pulls the levers down to their lowered position but the biasing force enables them to pivot upward in response to vertical movement of the barge caused by sea swell. This serves to maintain tension in the ropes at all times during the lifting of a floating barge from the water and vice versa.

According to a more limited aspect of the invention the carriages for the crane are propelled by means of a pin rack fixed to one side of each rail, and traveling drive units, supported from the crane by means of parallel links, the drive units having drive sprockets which mesh with the pin racks to provide positive driving engagement. The sprockets are positively positioned relative to the pin rack by means of horizontal rollers spaced on opposite sides of the rails. Operably associated with the drive sprockets is a braking mechanism adapted to lock the crane in a fixed position on the rails to prevent shifting during variations in trim.

It is among the objects of the invention to provide a gantry crane adapted for longitudinal travel on a ship on spaced rails located on opposite sides of the ship, the crane being effective to lift barges and to transport them above the cargo hatches of the ship between a cargo hold and an outboard floating position.

Another object of the invention is to provide a ship-mounted gantry crane adapted to lift barges from an outboard floating position, wherein means is provided for maintaining tension in the hoist ropes during vertical movements of the barge relative to the ship caused by sea swell while the barge is being lifted.

A further object of the invention is to provide a gantry crane adapted to lift floating barges from the water wherein means is provided to facilitate clamping a hoist mechanism to the barge while the barge is being tossed about due to sea swell.

Still another object of the invention is to provide a gantry crane adapted for longitudinal travel on a ship while laterally spanning the cargo hatches wherein the drive units supported by the crane for propelling it along the ship's deck are flexibly mounted in a manner permitting free lateral movement during travel of the crane so that lateral loads experienced by the crane are not carried by the drive units.

Other objects, uses and advantages of the invention will become apparent from the following detailed description and drawings which illustrate a referred embodiment of the invention but which are not intended to limit the scope thereof, wherein like parts are identified by like numerals and wherein.

Figure 1:
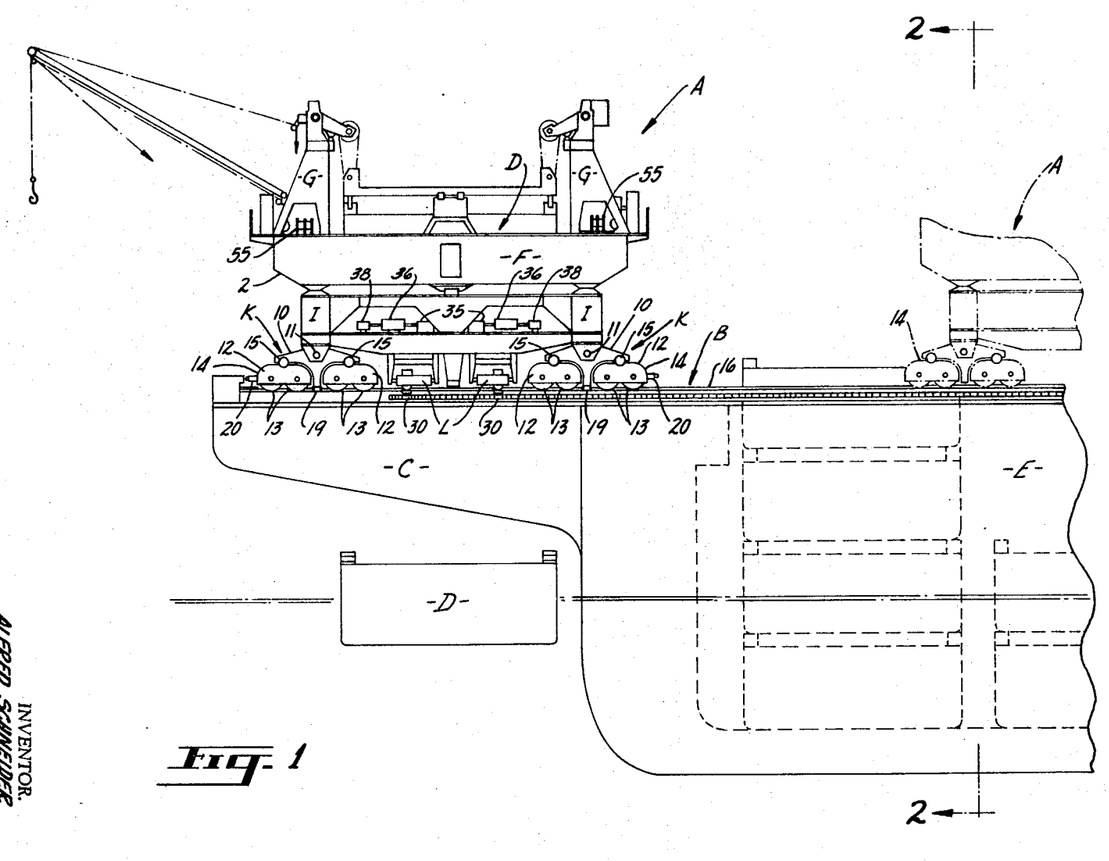
FIGURE 1 is a partial side elevational view of a ship having a gantry crane mounted for travel thereon for loading and unloading barges.
Figure 2:
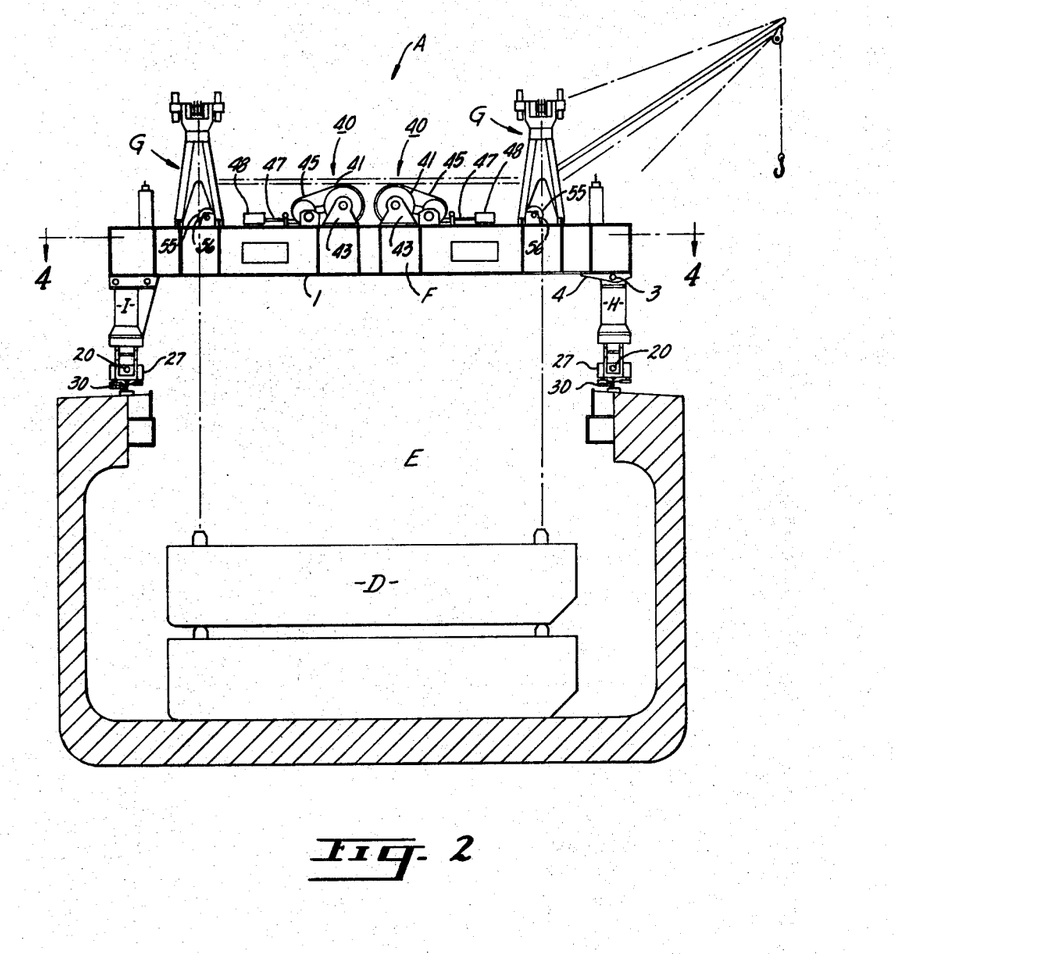
FIGURE 2 is a transverse sectional view of the ship of FIGURE 2 taken on the lines 2—2 of FIGURE 1.
Figure 3:
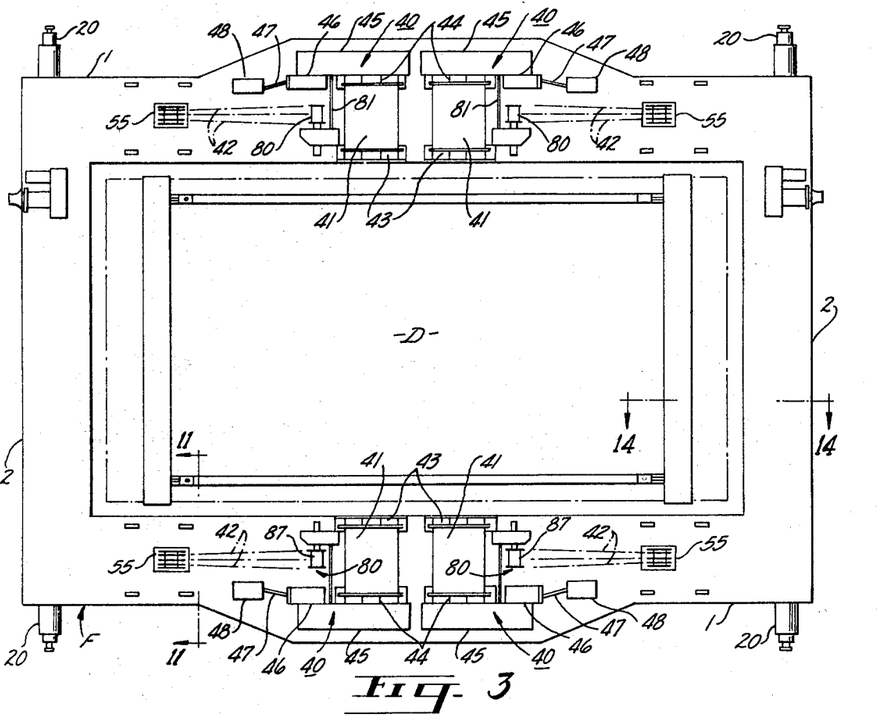
FIGURE 3 is a plan view of the gantry crane of FIGURES 1 and 2 showing a barge being lifted thereby.

Referring more particularly to the drawings and initially to FIGURE 1 there is shown a gantry crane A embodying the invention and located for travel on spaced rails B extending longitudinally along opposite sides of a ship. The ship has spaced cantilever stern beams C which provide a platform on which the crane A may travel to an outboard position as shown in solid lines in FIGURE 1 for lifting a floating barge D from the water. The crane is operative to lift the barge D out of the water and vertically upward to a position above the cargo hatches of the ship and to transport the barge D to a particular cargo hatch and lower it into a cargo hold E for storage.

General construction

The gantry crane A generally comprises a frame F which supports four masts G and which is carried on two port legs H and two starboard legs I, the legs H and I being connected to traveling carriages J and K respectively which provide for the travel of the crane A on the rails B.

Figure 5:
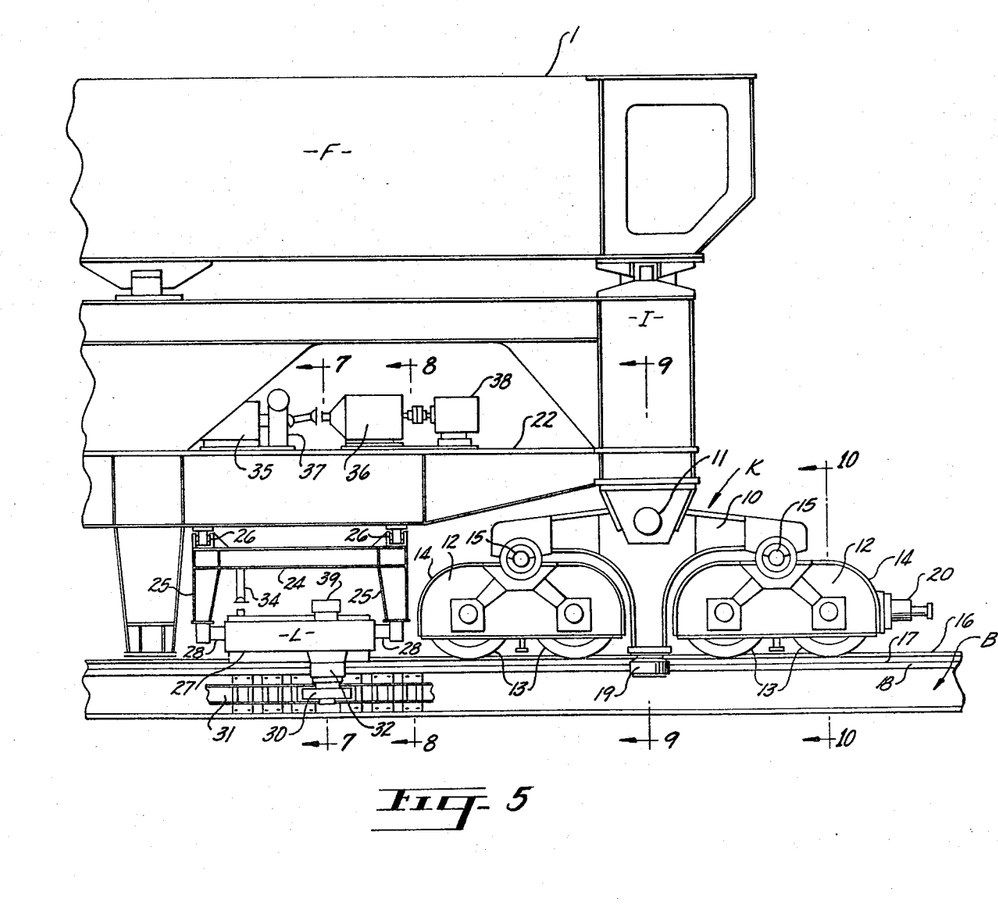
FIGURE 5 is a fragmentary side elevational view of the gantry crane of FIGURE 1 showing one carriage and one drive unit on the port side of the ship.
Figure 6:
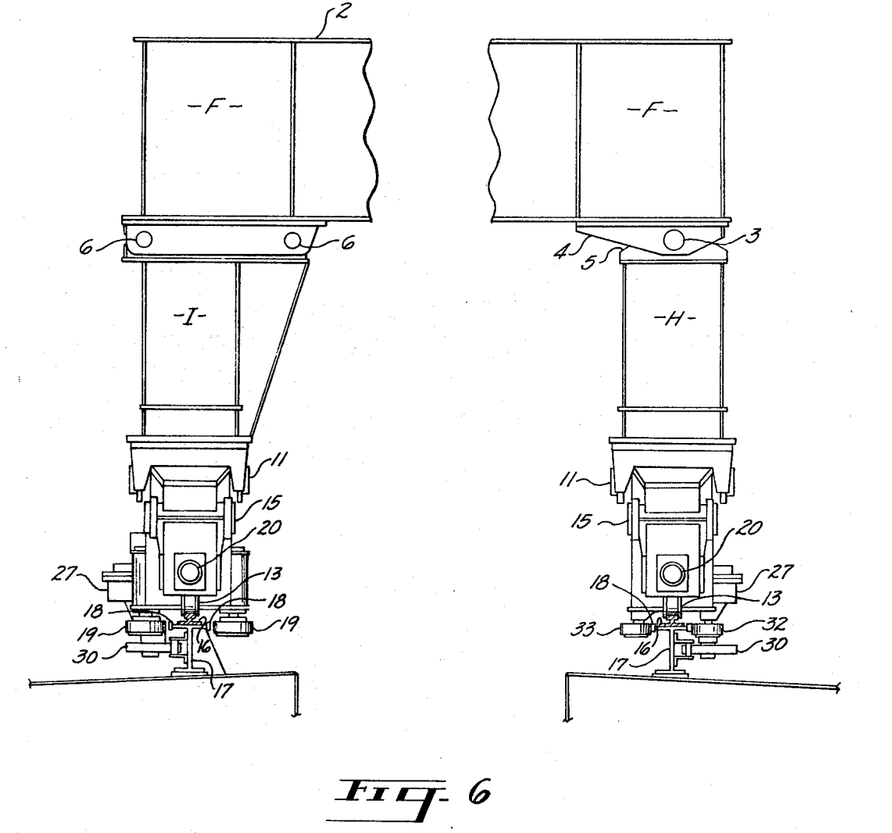
FIGURE 6 is a fragmentary end elevational view of the gantry crane of FIGURE 1 as seen looking toward the stern of the ship and showing an enlarged scale two legs of the crane on opposite sides of the ship.
Figure 7:
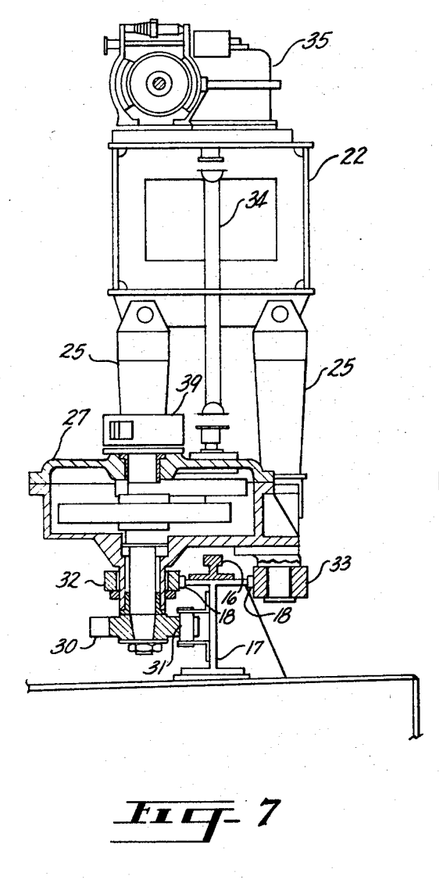
FIGURE 7 is a fragmentary sectional view taken on the line 7—7 of FIGURE 5.
Figure 8:
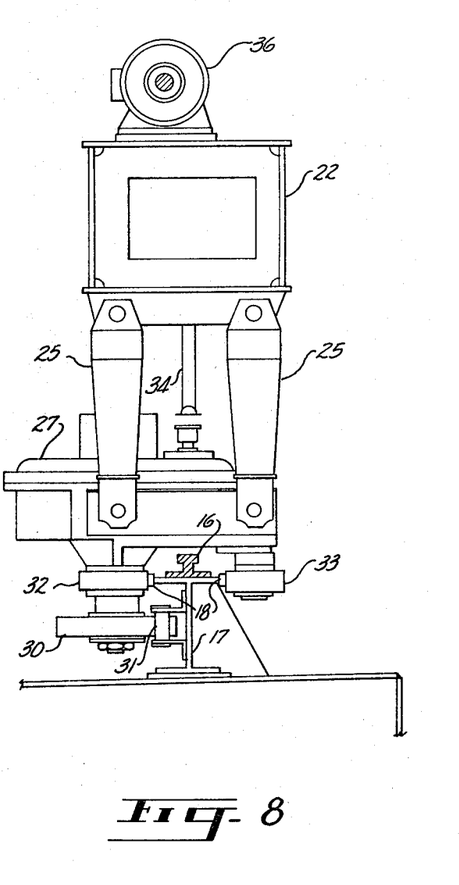
FIGURE 8 is fragmentary sectional view taken on the lines 8—8 of FIGURE 5.
Figure 9:
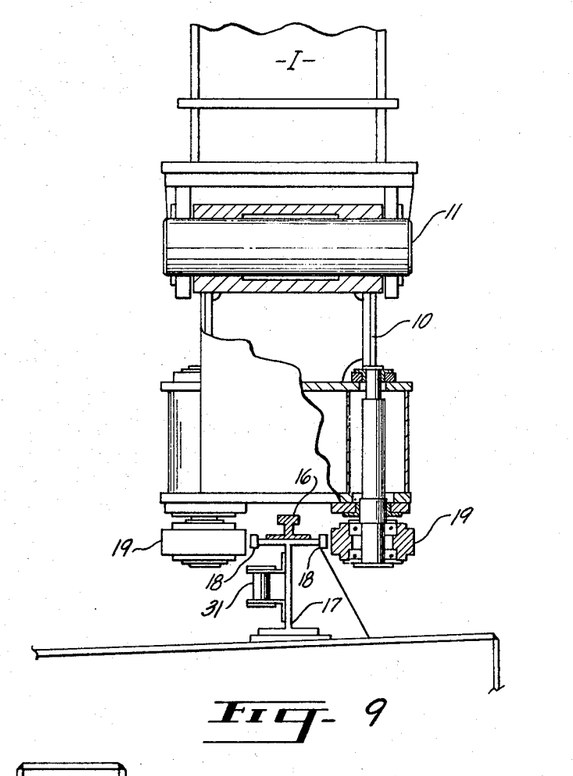
FIGURE 9 is a fragmentary sectional view taken on the lines 9—9 of FIGURE 5.
Figure 10:
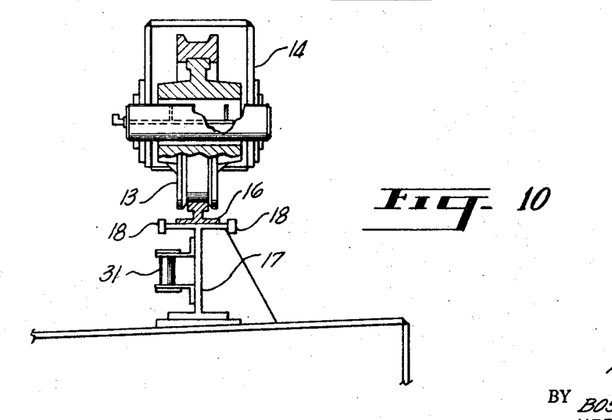
FIGURE 10 is a fragmentary sectional view taken on the lines 10—10 of FIGURE 5.

The frame F is of rectangular form and includes two transverse girders 1 which have a longitudinal dimension sufficient to span the width of the cargo hatches and end girders 2 which extend longitudinally of the ship. The girders 1 and 2 are of plate and torsion box construction according to current practice and enclose interior compartments which contain power equipment and other accessories. The frame F is preferably formed of high tensil steel to provide maximum strength and minimum weight. Referring to FIGURES 5 and 6 it will be seen that the port legs H are connected to the frame F by a hinge which permits the legs H to pivot in a plane perpendicular to the direction of travel of the carriages J on the rails B. The connection at each leg H is made by means of a hinge pin 3 extending through a pair of hinge brackets 4 attached to the frame F and another pair of hinge brackets 5 attached to the leg H. The purpose of the hinge connection is to permit the gantry crane to travel freely on the rails B when variations occur in the lateral spacing between the rails. Such variations are apt to occur due to errors in mounting and changing stresses imposed on the side walls of the ship. These variations cannot be compensated for by the width of the wheels themselves for reasons to be more fully presented below.

The starboard legs I are fixed to the frame F as shown in FIGURE 6 by means of spaced bolts 6 to provide a rigid mounting. Lateral loads experienced by the crane due to listing of the ship or due to wind for example are carried only by the fixed starboard legs I.

Travelling gear

Each of the port legs H is supported on a carriage J and each of the starboard legs I is supported on a carriage K. The carriages J and K as best shown in FIGURES 5 and 6, includes a frame member 10 connected to the leg by a pin 11. Connected at opposite ends of the frame 10 are two tandem wheel units 12 each of which includes two flanged wheels 13 mounted on a frame member 14, the wheel units 12 being connected to the frame member 10 by a pin 15. The wheels 13 are of the steel, rail-engaging type of conventional design and are adapted to ride on parallel rails 16 mounted on steel "I" beams 17 attached to the deck of the ship.

Attached to the ends of the top flanges of the steel "I" beams 17 are side rails 18 which serve a purpose to be discussed in more detail below.

The carriages K for the starboard legs I are identical in most respects to the carriages J for the port legs H, however, they include in addition, two horizontal rollers 19 spaced on opposite sides of the steel I beam 17 and adapted to engage the side rails 18. The rollers 19 are mounted on the frame member 10 as best shown in FIGURES 5 and 6, and are adapted to bear lateral loads carried by the fixed legs I and thus prevent these loads from being carried by the flanges of the wheels 13. One of the horizontal rollers 19 normally engages one of the side rails 18 but the lateral spacing between the rollers of each carriage K is sufficient to provide some lateral play. Horizontal rollers are not provided on the carriages J for the port legs H since the port legs H, being pivoted to the frame F, do not carry lateral loads.

Mounted on the front ends of the forward wheel units 12, and on the rear ends of the rearward wheel units 12 are shock absorbers 20 which may be either the rubber cushion type or hydraulic type and which are engageable with bumpers 21 at opposite ends of the rails 16 and which limit the longitudinal travel of the crane and also absorb the kinetic energy of the moving crane when it is stopped at the limit of its travel. Extending between the port legs H and the starboard legs I are cross-members 22 each of which provides a support for two drive units L. The drive units L are pivotally connected to the cross-members 22 by means of two elongated parallel link members 24, each of which has two longitudinally spaced arms 25. Each link 24 is pivotally connected to the cross-member 22 by means of two spaced hinge pins 26. The lower ends of the downwardly extending arms 25 are pivotally connected to a gear reduction unit 27 by means of pins 28. This provides a parallelogram support for the drive units L so that they are relieved of all lateral loads experienced by the crane and carried by the carriages J.

The drive for the crane A is provided by means of sprockets 30 extending downwardly from the gear reduction units 27 and adapted to engage a fixed roller chain or pin rack 31 attached to the outside of the web of each steel "I" beam 17. The roller chains or pin racks 31 extend the entire length of both rails as best shown in FIGURES 1 and 5.

Also mounted on the gear reduction units 27 are two spaced horizontal guide rollers 32 and 33 which are positioned to engage the side rails 18 mounted on opposite sides of the "I" beams 17 to insure proper engagement of each sprocket 30 with the roller chain 31. The horizontal guide rollers 33 on the opposite side of the steel "I" beam from the sprockets 29 are adjustable to compensate for variations in the dimensions of the beam, roller chain, etc.

The input drive for each gear reduction unit 27 is provided for by means of a propeller shaft 34 extending downwardly from a transmission unit 35 mounted on top of the cross-member 21. The transmission unit 35 is driven by an electric motor 36 and an electromagnetic hydraulic brake unit 37 is interposed between the motor 36 and the transmission unit 35 in order to provide braking for the drive when desired and to provide a positive lock which fixes the crane at a desired position on the rails and prevents the crane from rolling or sliding on the rails under varying conditions of longitudinal trim. The motors 36 receive their input energy from diesel powered generators 51 located within the transverse girders, one diesel motor 52 and generator 51 being provided for each two motors 36.

Connected to each motor 36 is a synchronizer unit 38 which synchronizes the speed of the motor 35 with the other four motors. The synchronizers are controlled by tachometers 39 which sense the rotary speeds of the sprockets 30. Each synchronizer unit 38 senses the position of opposite sides of the crane relative to the rails and provides signals which cause the motors to run at a faster or slower speed to equalize the relative positions.

*Hoist construction*

The hoist construction and operation will be best understood by referring to FIGURES 3 and 4 and 11–17. Four masts G are provided on the frame F, two of which are mounted on each transverse girder 1. Each mast G has a corresponding winch assembly 40 having a drum 41. Each of the drums 41 has circumferential grooves adapted to receive a hoist rope 42, each drum being adapted to wind the two ends of the hoist rope. The drums 41 are supported on pedestals 43 mounted on the girders 1, and are driven by a central drive shaft 44 connected to a gear box 45. The reduction gears in a gear box 45 are driven by a worm gear mounted in a casing 46, the worm shaft being connected to a propeller shaft 47 driven by an electric motor 48. The specific motor used is a DC series type motor. A solenoid brake 49 is interposed between the propeller shaft 47 and the worm gear casing 46.

Figure 4:
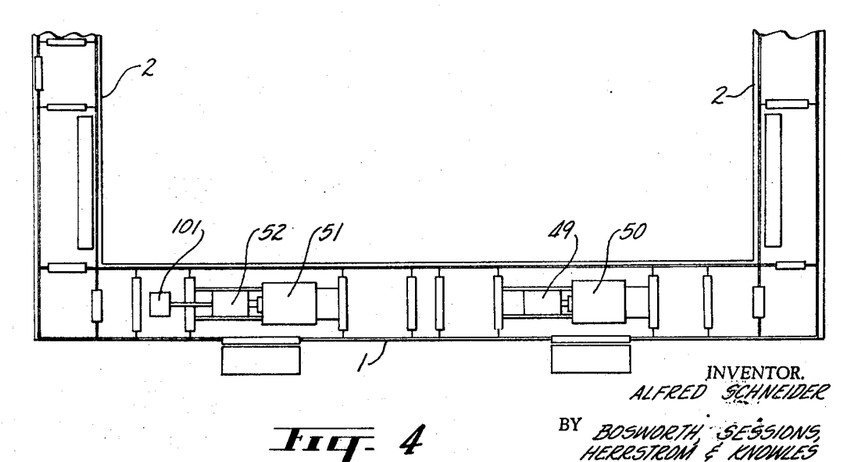
FIGURE 4 is a fragmentary sectional view taken on the lines 4—4 of FIGURE 2.

The motors 48 receive their input energy from diesel powered generators 49 located within the transverse girders 1. One diesel engine 50 and one DC generator 49 are provided for two of the electric motors 48. The location of the diesel engines 50 and generators 49 is best shown in FIGURE 4. Each winch assembly 40 provides a variable hoist speed which increases as the load decreases.

The hoist rope 42 from the winches 40 passes around a pulley 55 mounted on a bracket 56 secured to the frame F and then extend upwardly and pass over another pulley 61 located at the top of the mast G. The rope 42 is then reeved a number of times over pulleys 61 and 62 and finally over pulleys 61 and 55 and returned to the drum 40. The pulleys 62 comprise a sheave nest which is mounted at each corner of the traverse frame 63. The traverse frame 63 also provides a platform for four clamps 64 which are fastened to the sides of a barge to be lifted, the frame being formed of side and end members flexibly connected to one another to form a rectangle the opposite sides of which may move out of coplanar relation to one another.

Figures 14, 15:
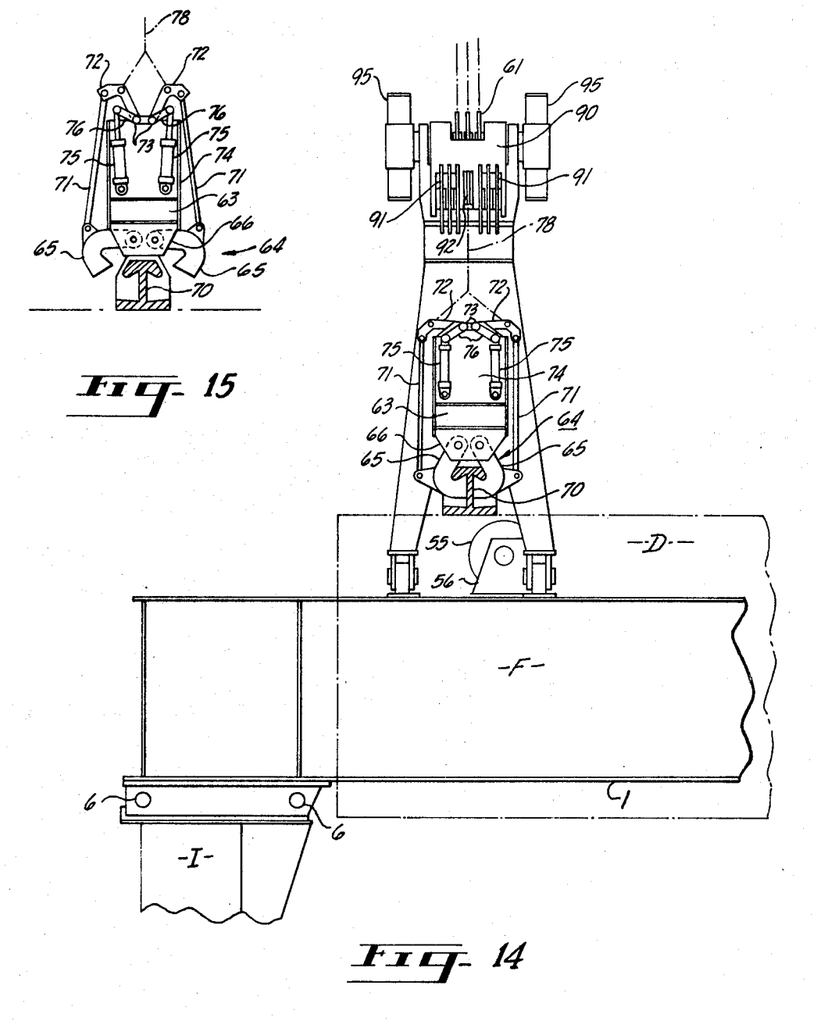
FIGURE 14 is a fragmentary transverse sectional view on an enlarged scale taken on the lines 14—14 of FIGURE 3 and showing the hoist, traverse frame and clamping mechanism.
FIGURE 15 is a fragmentary elevational view showing the clamping mechanism in its open position.
Figure 16:
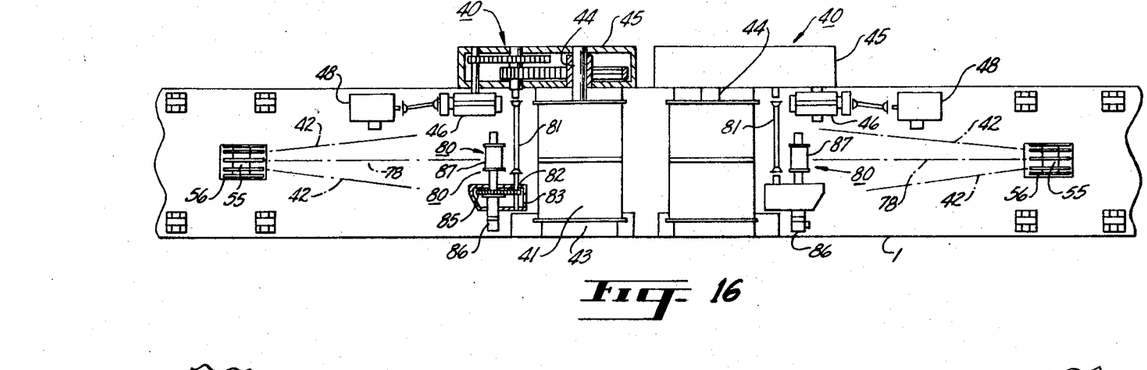
FIGURE 16 is a fragmentary plan view showing the location of the winch drive equipment on one of the transverse frame members of the crane.
Figure 17:
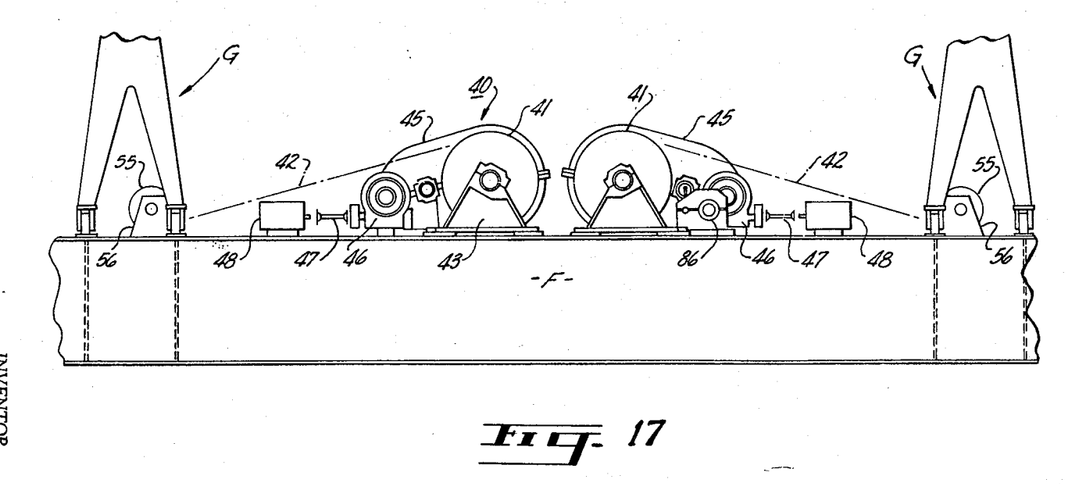
FIGURE 17 is a fragmentary end elevational view looking toward the stern of the ship.

The clamps 64 are best illustrated in FIGURES 14 and 15 and comprise two jaws 65 pivotally connected to a bracket 66 extending downwardly from the traverse frame 63. The jaws 65 are movable into gripping engagement with a flanged lift bracket 70 one of which is mounted on each corner of the barge D. Connected to each jaw 65 is a link 71 which is connected at its opposite end to a lever 72. The levers 72 are each connected to a shaft 73 which is pivotally mounted in a vertical bracket 74 mounted on top of the traverse frame 63.

The jaws 65 are biased to their closed position by means of coil springs mounted in two cylinders 75 each of which is connected to a lever 76 fixed to one of the shafts 73. The springs exert a downward force on the levers 76 and thus tend to pivot the levers 72 downwardly to bias the clamp to its closed condition shown in FIGURE 14.

Opening of the jaws 65 is provided for by means of a clamp rope 78 divided at its lower end into two separate lines which are connected to the clamp 64 midway between the ends of the levers 72. An upward force on the levers 72 tends to open the clamp 64 as indicated in FIGURE 15 to permit release of the traverse frame 63 from the barge when desired. The clamp ropes 78 extend from the separate sheaves on the pulleys 61 located on the masts G in the same manner as the hoist rope 42. From the pulley 61 the clamp rope extends downward to a separate sheave on the pulley 55 at the bottom of the mast G and then to a special clamping winch 80 mounted on the transverse girder 1. The clamp winch 80 is operatively connected to the hoist winch by a propeller shaft 81 which drives a pinion 82 and the ring gear of a planetary gear system 84. The sun gear 85 of the planetary gear system is driven by an electric motor 86.

The propeller shaft 81 drives a rope drum 87 in such a way that the drum runs the clamp rope in the same direction and at the same speed that the hoist drum operates the hoist ropes. However when the motor 86 is actuated the additional speed imparted to the drum 87 moves the clamp rope 78 at a greater relative speed to open the clamp jaws 65.

Accordingly when the traverse frame 63 is being lowered the clamp motor 86 can be actuated to relieve tension in the clamp rope 78 and thus permit the clamp jaws to close. Also when the traverse frame 63 is being raised the clamp motor 86 can be actuated to raise the clamp rope 78 and open the clamp jaws 65.

The clamp jaws 65 are so designed that the clamping force increases with the load to provide added safety. As mentioned above the clamp jaws 65 are biased to the closed position by means of the pneumatic cylinders 75 and also by their weight alone. The jaws 65 may be opened only by lowering the traverse boom until tension is relieved and then lifting the clamp rope 78.

Swell compensating mechanism

When barges are being loaded on a ship in open sea a vertical movement of the barge relative to the ship can be expected during lifting due to the effect of the natural sea swell. To compensate for this effect and to maintain tension in the hoist ropes 42 and clamp rope 18 at all times during the vertical lifting of the barge, a unique swell compensating mechanism is provided as best shown in FIGURE 11.

The swell compensating mechanism comprises a resilient rope tensioning member in the form of a lever 90 mounted on each mast G, each lever carrying at its outer end, pulleys 91 for a hoist rope 42, and also a smaller pulley 92 for the clamp rope 78. The pulley 92 is so located that the clamp rope 78 is vertically positioned mid-way between the hoist rope pulleys 91.

The outer end of each lever 90 is adapted for vertical travel to compensate for a maximum anticipated swell. The inner end of the lever 90 is connected to a pivot shaft 93 journaled at each end in bushings on the mast G, the shaft 93 being co-axial with the pulley 61 for the hoist ropes 42 and clamp rope 78.

Figures 11, 12, 13:
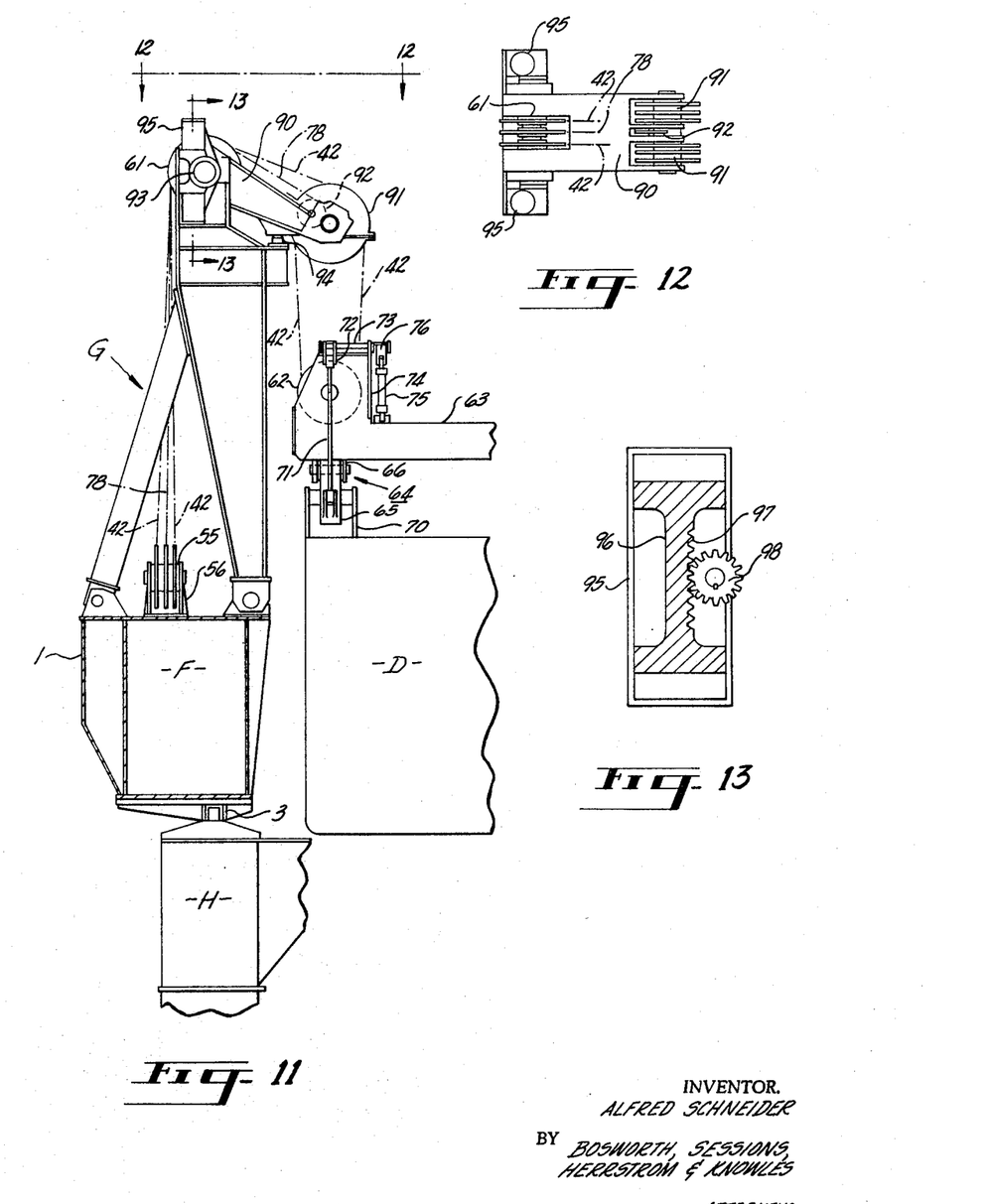
FIGURE 11 is a fragmentary sectional view on an enlarged scale taken on the lines 11—11 of FIGURE 3 and showing one of the masts and hoist mechanisms of the crane.
FIGURE 12 is a fragmentary plan view taken from the lines 12—12 of FIGURE 11.
FIGURE 13 is a fragmentary cross-sectional view on an enlarged scale taken on lines 13—13 of FIGURE 12.

When the lever 90 is in its lowered position as shown in solid lines in FIGURE 11, it bears against a shock absorber 94 located on the mast G so that most of the load is transmitted from the end of the lever 90 directly to the mast G and is not carried by the lever 90 alone.

The levers 90 are biased toward their raised position shown in dashed lines in FIGURE 11 by means of two hydraulic cylinders 95 spaced on either side of the lever 90. This arrangement is best shown in FIGURES 12 and 13. Each hydraulic cylinder 95 has a spool shaped piston 96 with a neck portion having a rack 97 formed therein. The racks 97 have teeth which engage pinions 98 secured to each end of the shaft 93. Accordingly linear movement of the piston 96 in each cylinder 95 turns the pinions 98 which in turn operate the lever 90 through its pivotal movement between a raised position shown in dashed lines in FIGURE 11 and a lowered position shown in solid lines in FIGURE 11. The hydraulic system for operating the cylinders 95 is best shown in FIGURE 18.

The hydraulic system for the cylinders 95 maintains the levers 90 in their raised position carrying the weight of the hoist ropes 42, clamp rope 78 and the traverse frame 63 while a barge D is floated into the stern area of the ship and while the traverse frame 63 is being lowered into clamping position. The barge D in a typical situation will be moving vertically up and down relative to the ship due to the swell. As the traverse frame 63 moves close to the lift brackets 70 on the barge D a portion of the pressure maintaining the levers 90 in their raised position is released by a crane operator and the levers pivot downward to drop the traverse frame 63 as much as 4 feet so that the clamp jaws 65 engage the lift brackets 70 on the barge.

With the traverse frame 63 so connected to the barge a relatively low pressure is applied to the cylinders 95 which is sufficient to force the levers 90 upward when the barge is lifted by the swell, in order to maintain at least a small tension in the hoist ropes 42 and clamp rope 78. This pressure is sufficient to keep the ropes 42 and 78 taut but is not enough to lift the traverse frame 63 away from the barge prior to the time that the clamping jaws 64 are locked to the barge lift brackets 70. This arrangement facilitates connection of the traverse frame 63 to the barge. When the barges are being lowered into the water the swell compensating device serves to facilitate release of the traverse frame 63 of the barge D by enabling the traverse frame to be quickly raised immediately after disconnection to avoid contact with the barge as it moves vertically due to swell. In a typical circumstance the high pressure provided by the cylinders is about 1275 p.s.i. and the low pressure is about 425 p.s.i.

Figure 18:
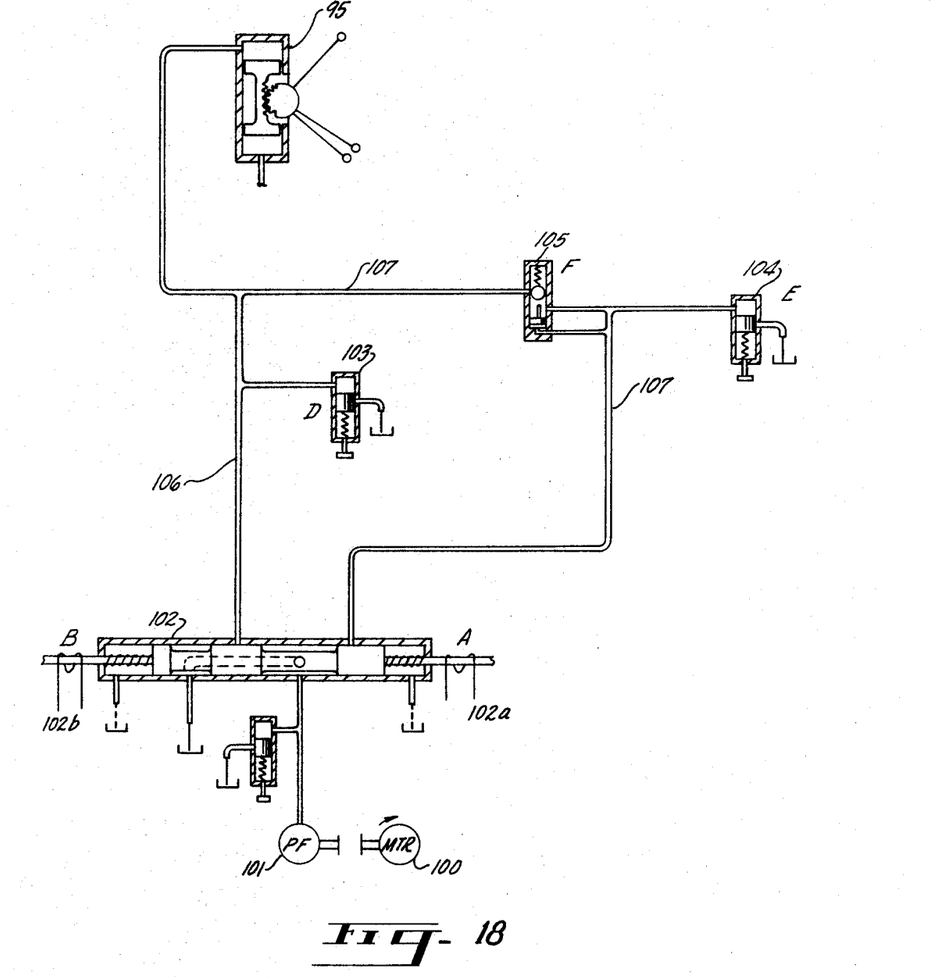
FIGURE 18 is a schematic diagram of the hydraulic system for the swell compensating device.

FIGURE 18 shows the hydraulic system for operating the swell compensating mechanism. The system generally includes a motor 100, a pump 101, a four-way solenoid operated hydraulic valve 102, a high pressure relief valve 103, a low pressure relief valve 104 and a one-way return valve 105.

During normal raising and lowering of the traverse frame 63 when it is not connected to a barge, the solenoid valve 102 directs fluid to the upper end of the hydraulic cylinders 95 through both a high pressure line 106 and a low pressure line 107. Pressure in the high pressure line 106 is limited by the high pressure relief valve 103 which maintains a pressure of about 1275 p.s.i. Pressure in the low pressure line 107 is limited to 425 p.s.i. by the low pressure relief valve 104. Fluid flowing through the low pressure line 107 passes through the one-way return valve 105 which prevents a back-up of fluid due to the higher pressure in the high pressure line 106. With the high pressure line 106 in operation, sufficient force is provided by the hydraulic cylinders 95 to maintain the levers 90 in their raised position while carrying the weight of the traverse frame 63, hoist ropes 42 and clamp rope 78. In this condition the motor 100 is operating to run the pump 101 and solenoid 102a is actuated.

When the clamps 64 on the traverse frame 63 are in position for connection to the lift brackets 70 on a barge D, solenoid 102b is actuated and fluid pressure to the high pressure line 106 is cut off. Accordingly the excess pressure will be relieved and the pressure in the system will be reduced to about 425 p.s.i. This reduces the pressure in the cylinder 95 tending to hold the levers 90 in their raised position and accordingly the weight of the traverse boom 63 forces the levers 90 to their lowered position. Enough pressure is retained in the system, however, to maintain tension in the hoist ropes 42 to compensate for swell and the resulting vertical movement of the barge. The primary purpose of the low pressure in the cylinder 95 is merely to maintain the tension in the lines and it will be seen that it is not sufficient to hold the levers 90 in a raised position when carrying the weight of both the traverse frame 63 and the hoist ropes 42.

General operation

During the loading of cargo laden barges on a ship of the type designed for the purpose referred to herein, the gantry crane A is positioned on the cantilever stern beams C so that it overlies a floating barge outboard of the ship. The crane A is positioned on the rails 16 in such a way that depending upon the longitudinal trim of the ship it can hoist the barges vertically without interference and carry them at a position high enough to transport them across the top of the cargo hatches.

With the crane A thus positioned the traverse frame 63 is lowered from the four masts G, the levers of the swell compensating mechanism being held in a raised position by the hydraulic cylinders 95 which are acted upon by a high fluid pressure.

The traverse frame 63 is lowered to a position just above the barge at maximum swell, the barge being secured at the stern of the ship. At a suitable moment the barge operator presses a swell button which releases the high pressure in the swell compensating mechanism hydraulic system so that the weight of the traverse frame 63 forces the levers 90 down to their lowered position and permits the clamping jaws 65 on the traverse frame 63 to engage the four lift brackets 70 at the corners of the barge. If desired the levers may be dropped individually so that the clamps engage the lift brackets one-at-a-time rather than simultaneously.

The clamping is conmpleted by energizing the electric motor which controls the speed of the clamping winch 80 and thus relieves tension in the clamp rope 78 permitting the clamping jaws 65 to move into their clamping position. The hoist winches 40 are then operated to begin raising the barge. As more weight is carried by the hoist ropes 42 the levers 90 are pulled down to the shock absorbers 94 on the masts G so that less weight is carried directly by the levers 90.

The barge is then raised to a desired height sufficient to clear the cargo hatches and the drive units L for the crane are operated to move the crane in a positive manner along the rails 16 to a position over the cargo hatch through which the barge D is to be lowered. At this time the crane is braked to a stop and the brakes are locked to prevent movement on the crane on the rails 16. The hoist winches are then actuated in a reverse manner to lower the barge into the hold to a storage position. When the barge is secure in the hold and tension on the hoist ropes is relieved, the clamp ropes 78 are pulled upward to release the jaws 65 from the lift brackets 70 of the barge and permit the traverse frame 63 to be raised out of the hold. Tension on the clamp rope 78 is retained to keep the jaws in their open position.

When unloading the barges at destination the gantry crane is positioned and locked to the rails over the cargo hatch from which the barge is to be raised. The transverse frame 63 with the clamp ropes 78 taut is then lowered through the hatch with the levers 90 in their raised position. When the traverse frame 63 is suitably positioned over the barge, the high pressure in the hydraulic system for the swell compensating device is released and the levers 90 drop the traverse frame and clamps 64 on to the lift brackets 70 of the barge. The clamp ropes 78 are then released to permit the clamping jaws 65 to clamp on the lift brackets 70 and the barge is lifted in the same manner as before. When the barge has been raised to a desired height the drive units L are operated to move the crane again to the stern of the ship on the cantilever stern beams C so that it overlies an outboard area. The crane is then braked to a stop and locked to the rails in a position which will permit lowering of the barge to the water without interference with the stern of the ship.

The hoist winches 40 are operated in a reverse manner to lower the barge into the water until it floats freely throughout its upper lower limits of vertical movement due to swell. The swell compensating mechanism is effective during the last portion of the lowering of the barge to maintain tension in the hoist ropes while the barge is tossed by the swell.

During this portion of the operation the swell compensating device is maintained at a high pressure and when the clamp ropes 78 are pulled to release the clamps 64 from the barge the traverse frame 63 is immediately pulled upward and away due to the raising of the levers to their raised position. Normally this upward movement of the levers raises the traverse frame 63 above the barge to a sufficient height that it will not contact the barge even when the barge is at its highest point during maximum swell. The hoist winches 40 are then actuated to raise the traverse frame 63 upward to its carrying position.

While a preferred form of my invention has been shown and described with reference to a specific embodiment thereof, this is intended only for the purpose of illustration rather than limitation, and other variations and modifications will become apparent to those skilled in the art within the intended spirit and scope of the invention as herein specifically illustrated and described. I do not want to be limited in the scope and effect of my patent to this preferred and illustrative form of my invention, nor in any other way that is inconsistent with the progress by which the art has been promoted by my invention.

I claim:

1. A gantry crane adapted for operation on a vessel to lift barges and transport them from an outboard floating position astern the vessel to, and through a hatch and into a cargo hold, comprising a body having a transverse dimension sufficient to span the hatch, legs supporting said body, carriages attached to the lower ends of said legs, port and starboard parallel ways on opposite sides of said hatch upon which said carriages ride, means for guiding and propelling said carriages fore and aft of said ship on said ways, hoist means on said body for lifting a barge, said hoist means including a traverse frame suspended from said crane body by a plurality of rope falls for connection to said barge and a resilient rope tensioning member operatively connected to each rope fall between said body and said traverse frame for compensating for relative motion between said vessel and said barge while said traverse frame is engaging said barge and said barge is being tossed by sea swell.

2. The crane defined in claim 1 wherein said means for guiding and propelling said carriages includes spaced parallel rails having a pin rack fixed to at least one side thereof, traveling drive units suspended from said legs by spaced parallel links pivotable in a direction normal to said rails to provide a parallelogram support and drive sprockets carried by said drive units to drivingly engage said pin racks.

3. The crane as defined in claim 1 wherein said resilient rope tensioning members comprise load bearing levers each having one end pivotally connected to said crane and carrying said ropes at the other end, said levers being pivotable between a raised position and a lowered load carrying position and means biasing said levers to said raised position with sufficient force to maintain tension in said ropes during the lifting operation while said barge is being tossed by sea swell.

4. The crane of claim 3 wherein said traverse frame is about the same horizontal size as said barge, and a plurality of coacting clamping means are carried by said barge and said frame said means being mutually and severally engageable upon contact between proximate parts of said barge and said frame.

5. The crane of claim 1 wherein said traverse frame is of about the same plan and size as the deck of the barge to be lifted and comprises side members and end members flexibly connected to one another to form a rectangle, the opposite side of which may move out of coplanar relation to one another, automatic mutually engageable individual coupling adjacent the corners of the frame and barge, and means for effecting engagement of said couplings independently.

6. The crane of claim 5 with ropes between the several corners of said frame and said hoist means and biasing means joining said ropes to said hoist means for limiting the strain in said ropes until all said couplings are engaged.

7. A gantry crane adapted for operation on a vessel to lift barges and transport them from an outboard floating position astern the vessel to and through a hatch and into a cargo hold, comprising a body having a transverse dimension sufficient to span the hatch, legs supporting said body, carriages attached to the lower ends of said legs, port and starboard parallel rails on opposite sides of said hatch upon which carriage ride, traveling drive units for propelling said crane fore and aft on said vessel, parallel link means for connecting said drive units to said crane, said link means including pairs of laterally spaced parallel links pivotable in a plane perpendicular to said rails, and traction means secured to said rails, said drive units including rotary drive members engageable with said traction means to propel said crane along said rails.

8. In a gantry crane adapted to lift floating barges from the water comprising a frame having a transverse dimension sufficient to span a barge and legs supporting said body, a hoist mechanism comprising levers pivotally connected to said body for movement in a vertical plane between a raised position and a lowered load carrying position, hoist ropes suspended from the movable end of each lever, winch means for operating said hoist ropes, a traverse frame supported by said hoist ropes and adapted to be attached to a barge and to support the barge during lifting, first means biasing said levers to their raised position with a large force sufficient to overcome the weight of said hoist ropes and traverse frame, second means biasing said levers to their raised position with a smaller force sufficient to maintain tension in said hoist ropes when the barge and traverse frame are being tossed by sea swell, the weight of said traverse frame being sufficient to overcome said smaller force, and control means for selectively applying one of said first and second means to said levers whereby said traverse frame may be dropped onto a barge to be lifted when the barge is properly aligned for attachment to said traverse frame.

References Cited

UNITED STATES PATENTS

| | | | |
|---|---|---|---|
| 2,293,936 | 8/1942 | Crooke | 214—14 X |
| 2,355,235 | 8/1944 | Nickles | 212—3 |
| 2,786,709 | 3/1957 | Wirkkala | 294—112 X |
| 3,042,227 | 7/1962 | Tantlinger | 214—15 |
| 3,204,780 | 9/1965 | Holt et al. | 212—3 X |
| 3,262,580 | 7/1966 | Markowitz | 212—6 |
| 3,273,527 | 9/1966 | Goldman | 114—43.5 |
| 3,297,353 | 1/1967 | Carlson | 294—112 X |
| 3,309,065 | 3/1967 | Prud'homme et al. | 254—172 |

FOREIGN PATENTS 1,101,720  3/1961  Germany.

MILTON BUCHLER, *Primary Examiner.*

FERGUS S. MIDDLETON, *Examiner.*

T. MAJOR, *Assistant Examiner.*

PO-1050
(5/69)

UNITED STATES PATENT OFFICE
CERTIFICATE OF CORRECTION

Patent No. 3,390,657            Dated July 2, 1968

Inventor(s)      A. Schneider

It is certified that error appears in the above-identified patent and that said Letters Patent are hereby corrected as shown below:

Column 7, line 49, delete the words "shown in dashed lines in Figure 11";
     Column 7, lines 58 and 59, delete the words "shown in dashed lines in Figure 11";
     Column 11, line 11 (in claim 8), change "frame" to --body--.

**SIGNED AND
SEALED
MAR 3 - 1970**

(SEAL)
Attest:

Edward M. Fletcher, Jr.
Attesting Officer

WILLIAM E. SCHUYLER, JR.
Commissioner of Patents